Dec. 18, 1923.  
L. W. ANDERSON  
1,478,163  
ERECTOR FOR TUNNEL STRUCTURES  
Filed June 20, 1919   10 Sheets-Sheet 2

Inventor  
Louis W. Anderson  
By Jones, Addington, Ames & Seibold  
Attys

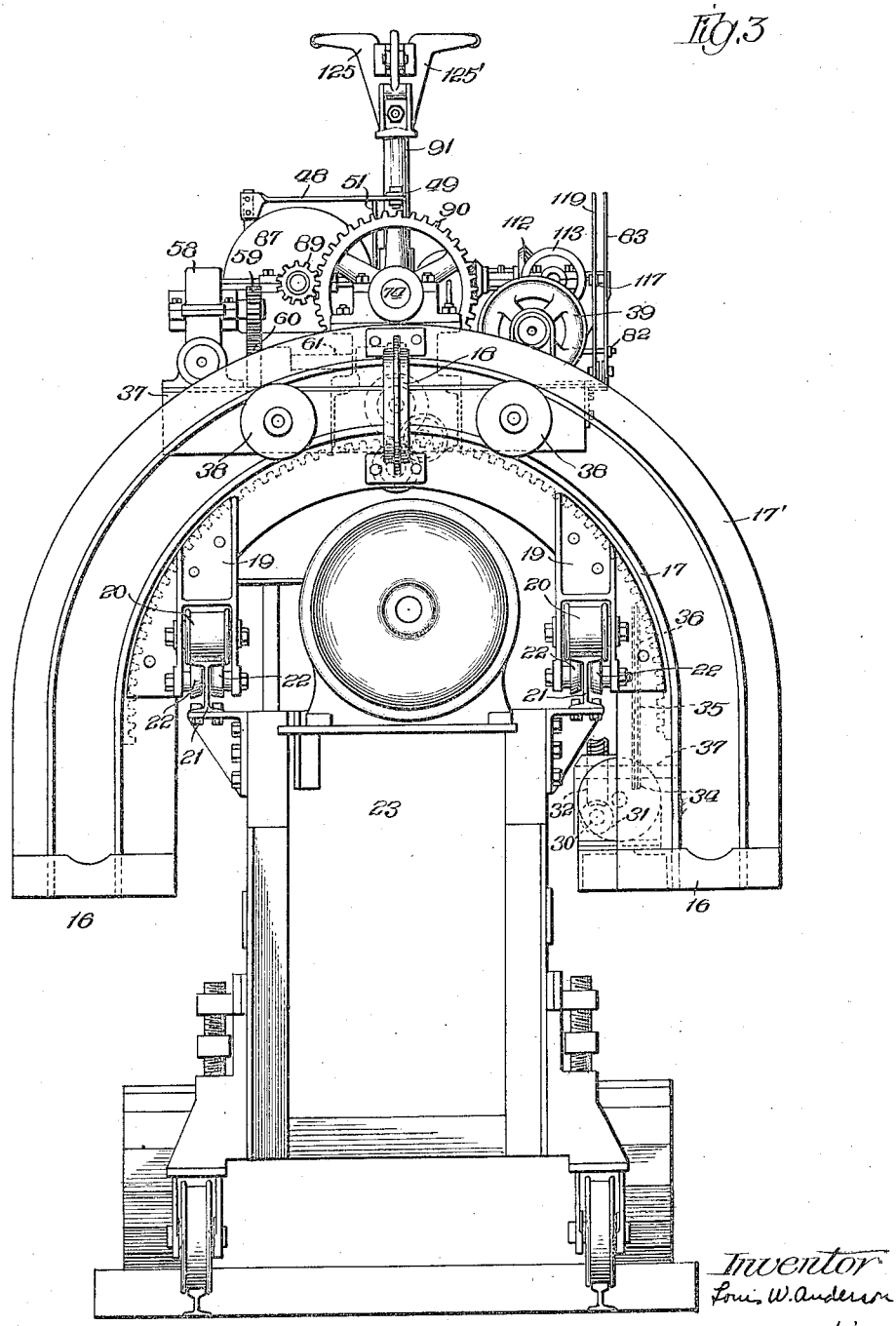

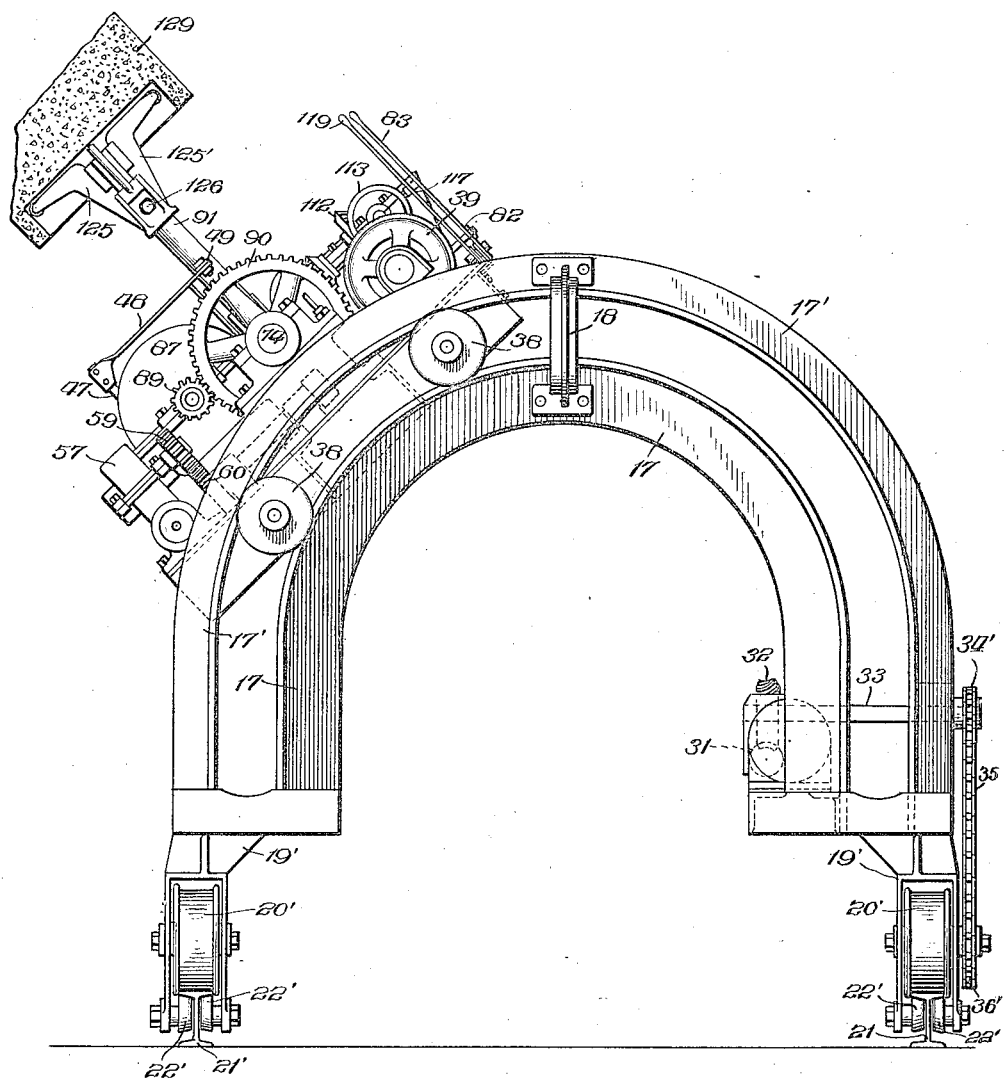

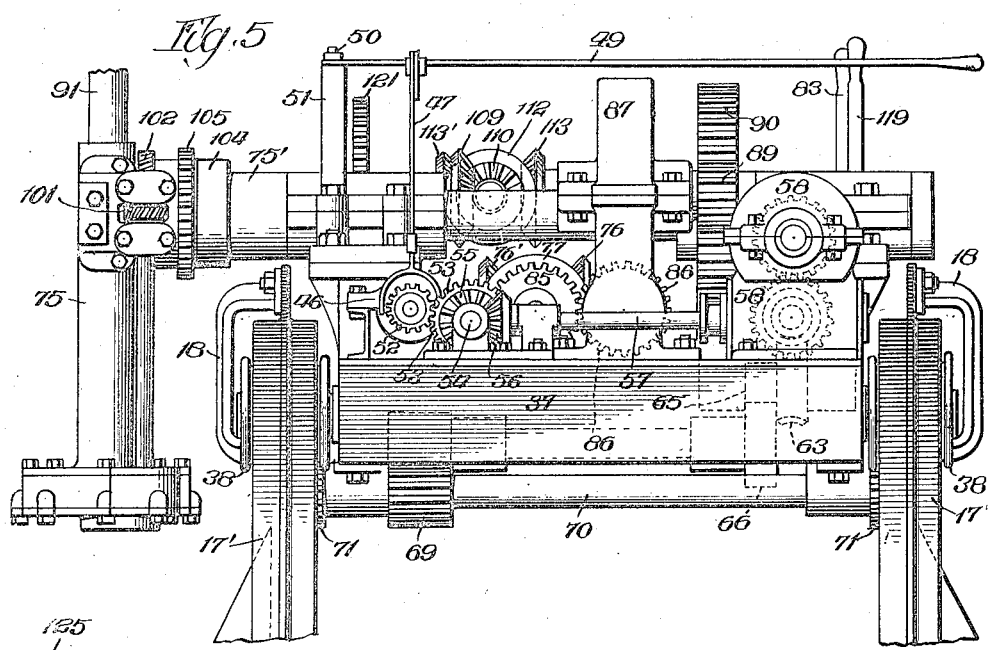

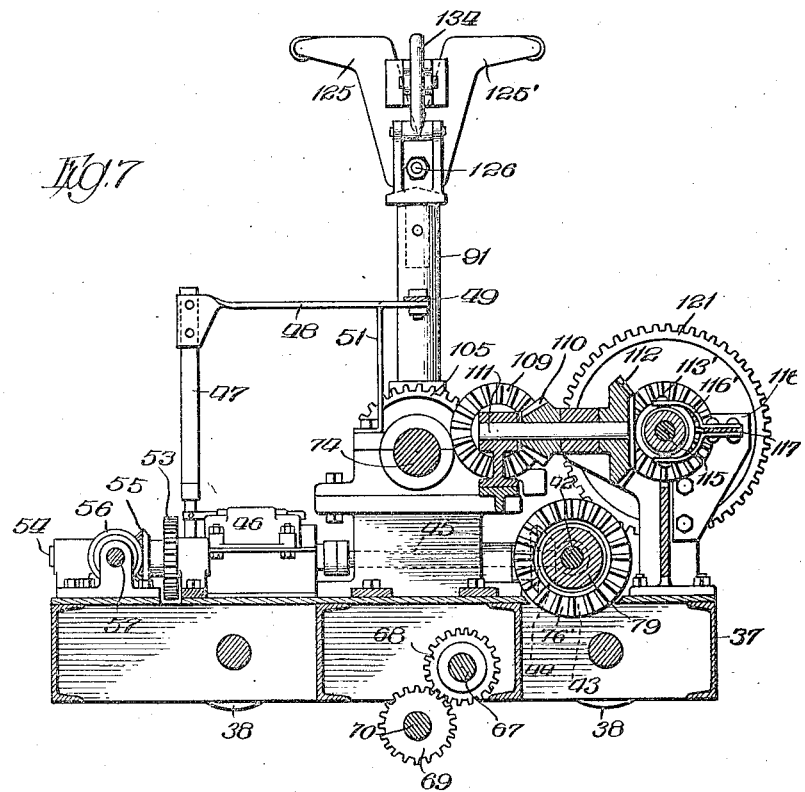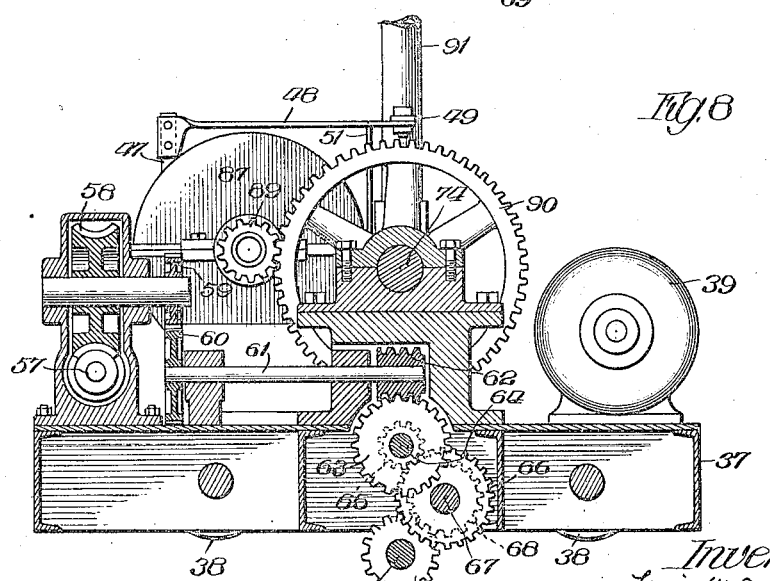

Dec. 18, 1923.
L. W. ANDERSON
1,478,163
ERECTOR FOR TUNNEL STRUCTURES
Filed June 20, 1919    10 Sheets-Sheet 7
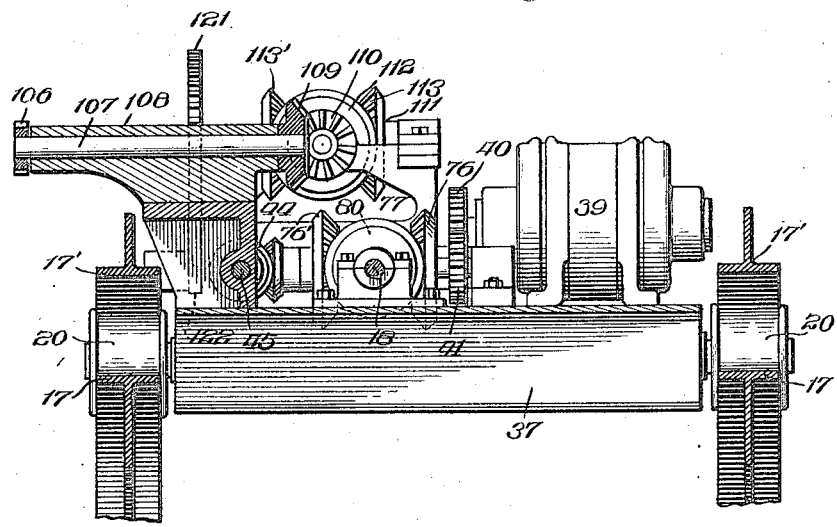
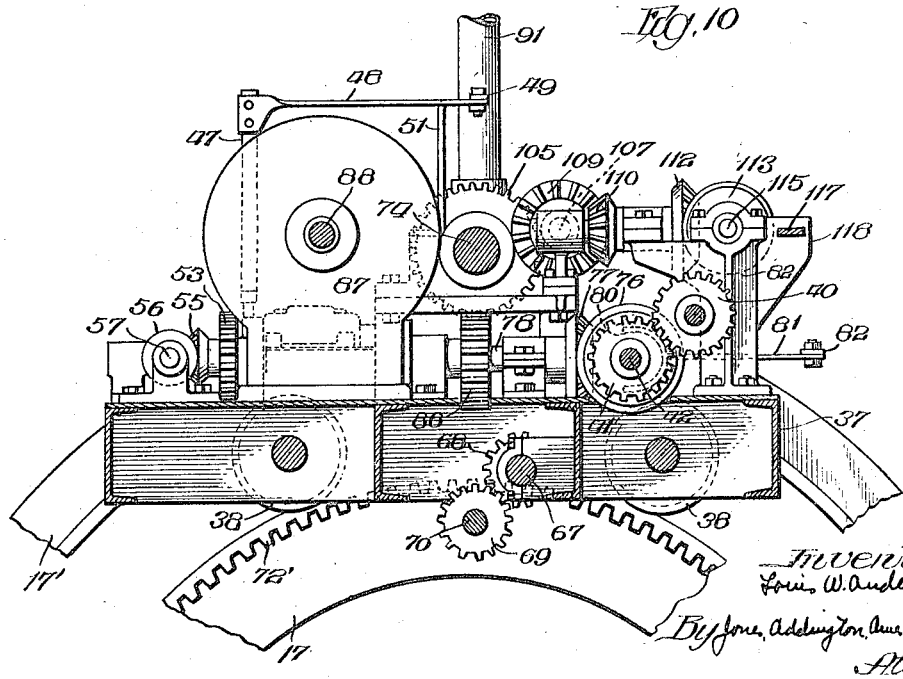

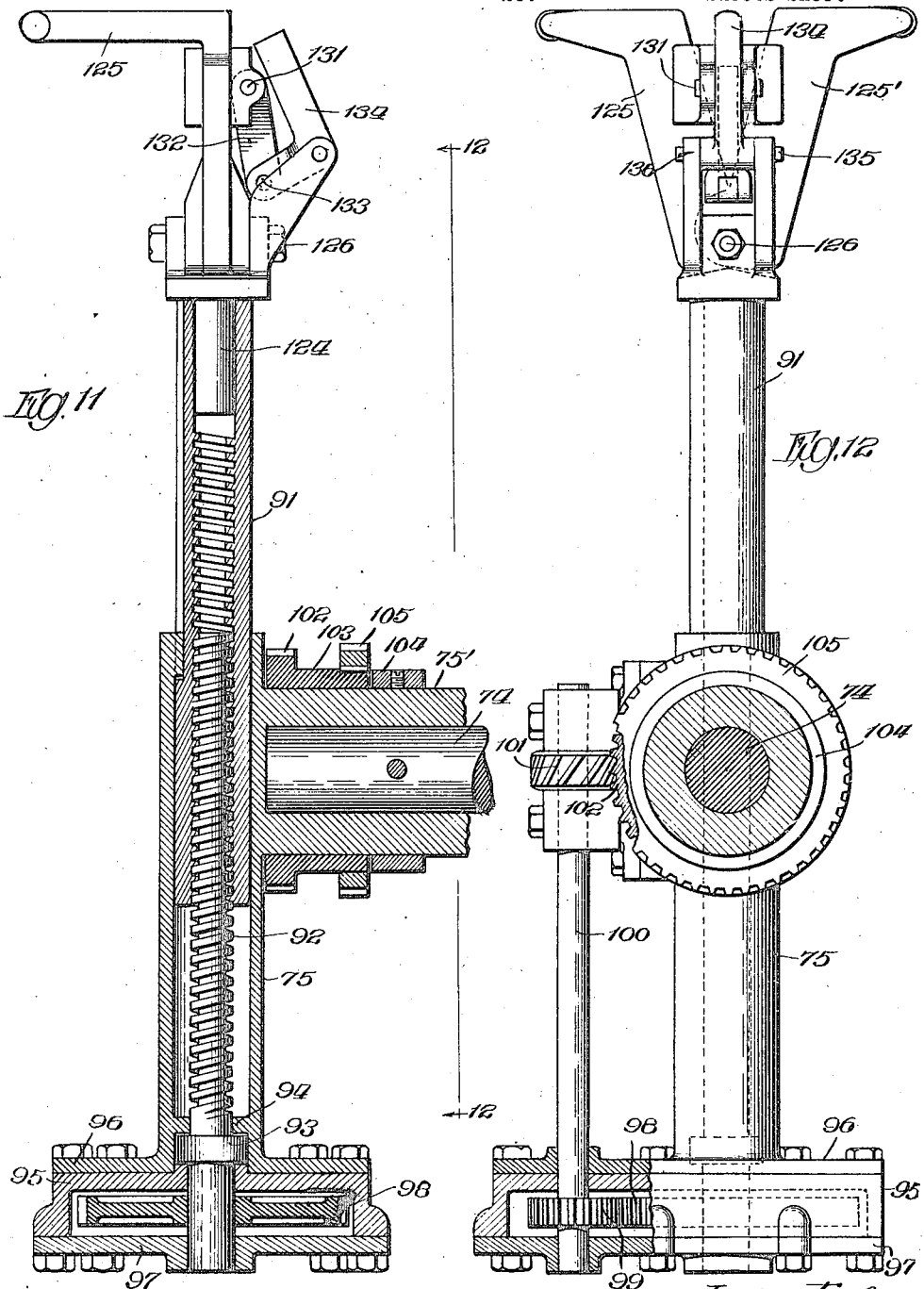

Dec. 18, 1923.
L. W. ANDERSON
ERECTOR FOR TUNNEL STRUCTURES
Filed June 20, 1919    10 Sheets-Sheet 9
1,478,163
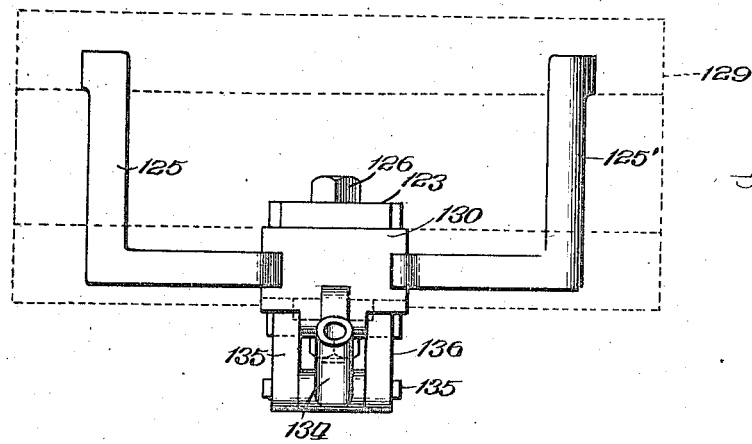
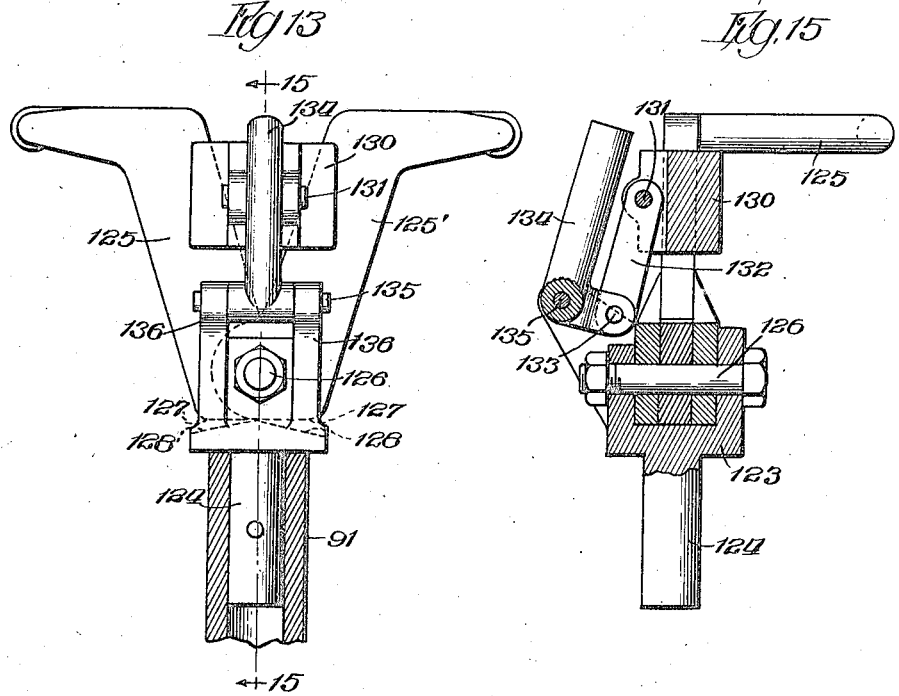
Inventor
Louis W. Anderson
By Jones, Addington, Ames & Seibold
Attys Dec. 18, 1923.

L. W. ANDERSON 1,478,163

ERECTOR FOR TUNNEL STRUCTURES

Filed June 20, 1919   10 Sheets-Sheet 10

Inventor
Louis W. Anderson

By Jones, Addington, Ames & Seibold
Attys

Patented Dec. 18, 1923.

1,478,163

UNITED STATES PATENT OFFICE.

LOUIS W. ANDERSON, OF GRAND RAPIDS, MICHIGAN, ASSIGNOR TO THE TUNNEL & SEWER MACHINE ENGINEERING COMPANY, OF BUFFALO, NEW YORK, A CORPORATION OF NEW YORK.

ERECTOR FOR TUNNEL STRUCTURES.

Application filed June 20, 1919. Serial No. 305,632.

*To all whom it may concern:*

Be it known that I, LOUIS W. ANDERSON, a citizen of the United States, residing at Grand Rapids, in the county of Kent and State of Michigan, have invented new and useful Improvements in Erectors for Tunnel Structures, of which the following is a full, clear, concise, and exact description, reference being had to the accompanying drawing, forming a part of this specification.

My invention relates to improvements in erectors for tunnel structure, and has for its object the production of a machine of this character, which, when in use, will occupy space in the tunnel bore removed from the center or axial portion thereof so as to permit of the simultaneous employment of a tunnel boring or excavating machine or the ready passage of muck or material cars thereunder.

A further object is the production of a tunnel structure erector which will be capable of universal adjustment so as to permit of ready handling of the blocks or other tunnel structure elements and placing of the same in the precise position desired during the erecting operation.

A still further object is the production of a tunnel structure erector which may be readily operated and which will be highly efficient in use. Other objects will appear hereinafter.

With these objects in view, the invention consists in the combinations and arrangements of parts hereinafter described and claimed.

The invention will be best understood by reference to the accompanying drawings forming a part of this specification, and in which—

Fig. 3 is rear end view of said construction, the erector carrier being shown in central position;

Fig. 4 is a view similar to Fig. 3 showing the erector carrier in angular or oblique position, and mounted on rails independent of the boring machine;

Fig. 5 is a side elevation of the erector carrier, showing the adjacent portions of the supporting rails cooperating therewith, this figure being a view looking in the opposite direction from that shown in Fig. 2;

Figure 1:
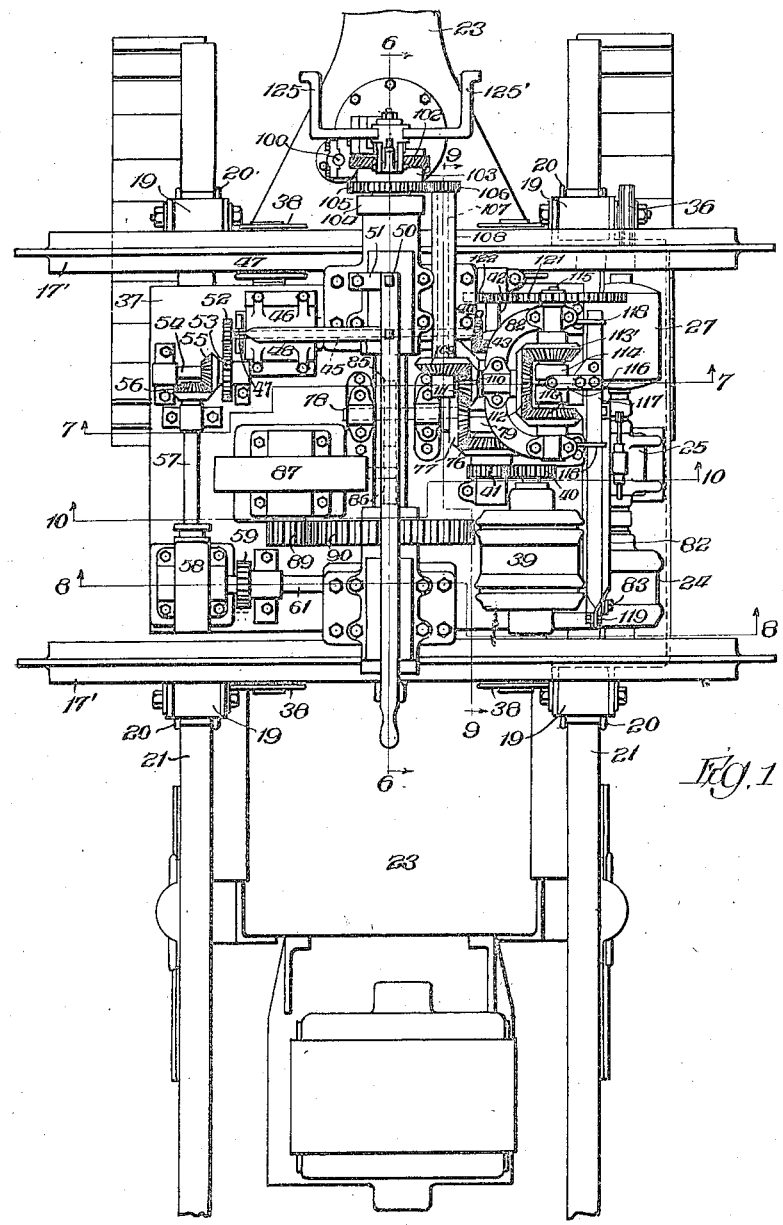
Fig. 1 is a top plan view of a tunnel structure erector embodying the invention, the same being shown mounted upon a conventional tunnel boring machine.

Figs. 6, 7, 8, 9 and 10 are slightly enlarged sections taken on substantially lines 6—6, 7—7, 8—8, 9—9, and 10—10 respectively of Fig. 1;

Fig. 11 is a central section of the erector arm;

Fig. 12 is a section taken on line 12—12 of Fig. 11;

Fig. 13 is a rear view of the work holder which is provided at one end of said erector arm;

Fig. 14 is a top plan view of said work holder, and

Figure 16:
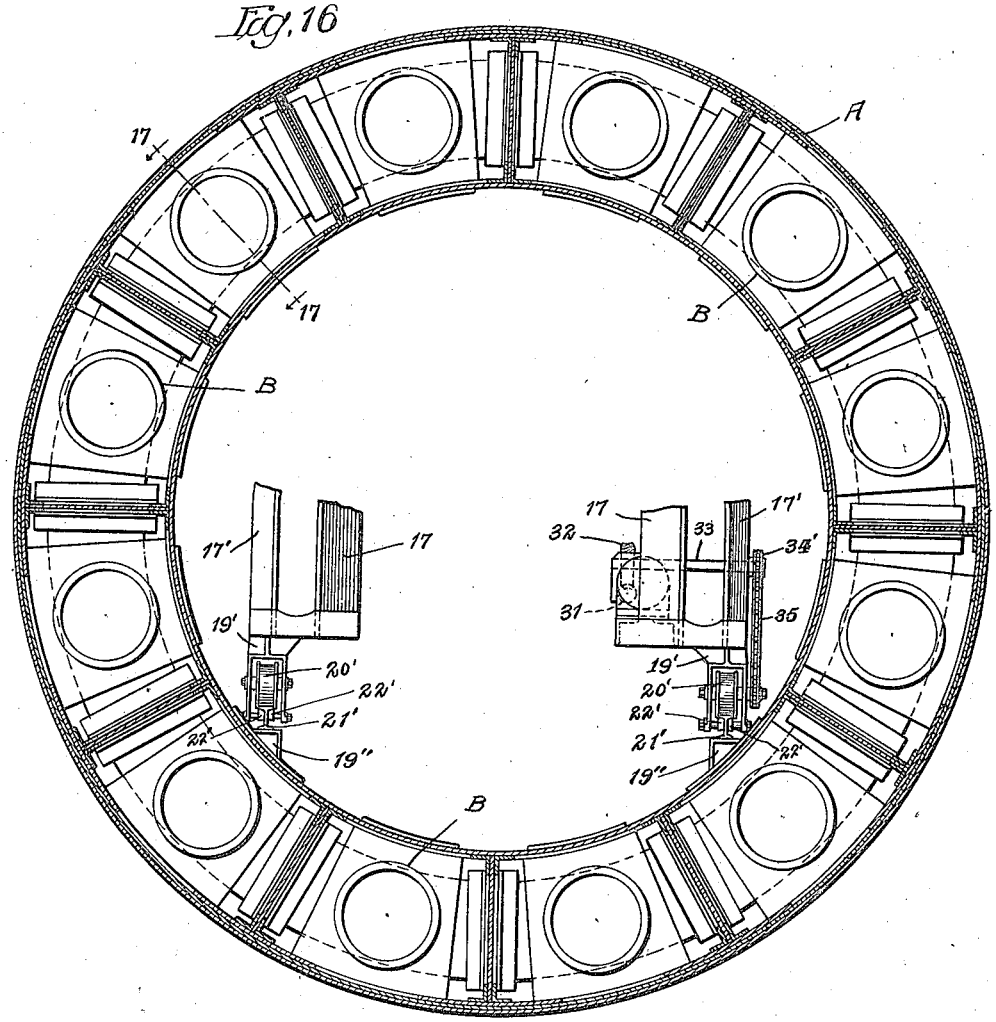
Figure 17:
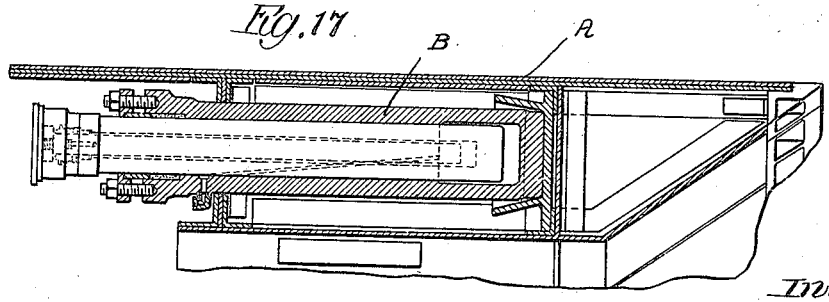

Fig. 15 is a section taken on substantially line 15—15 of Fig. 13;

Fig. 16 is a transverse section of a tunnel shield provided with erector-supporting rails; and Fig. 17 is a section taken on line 17—17 of Fig. 16.

Figure 2:
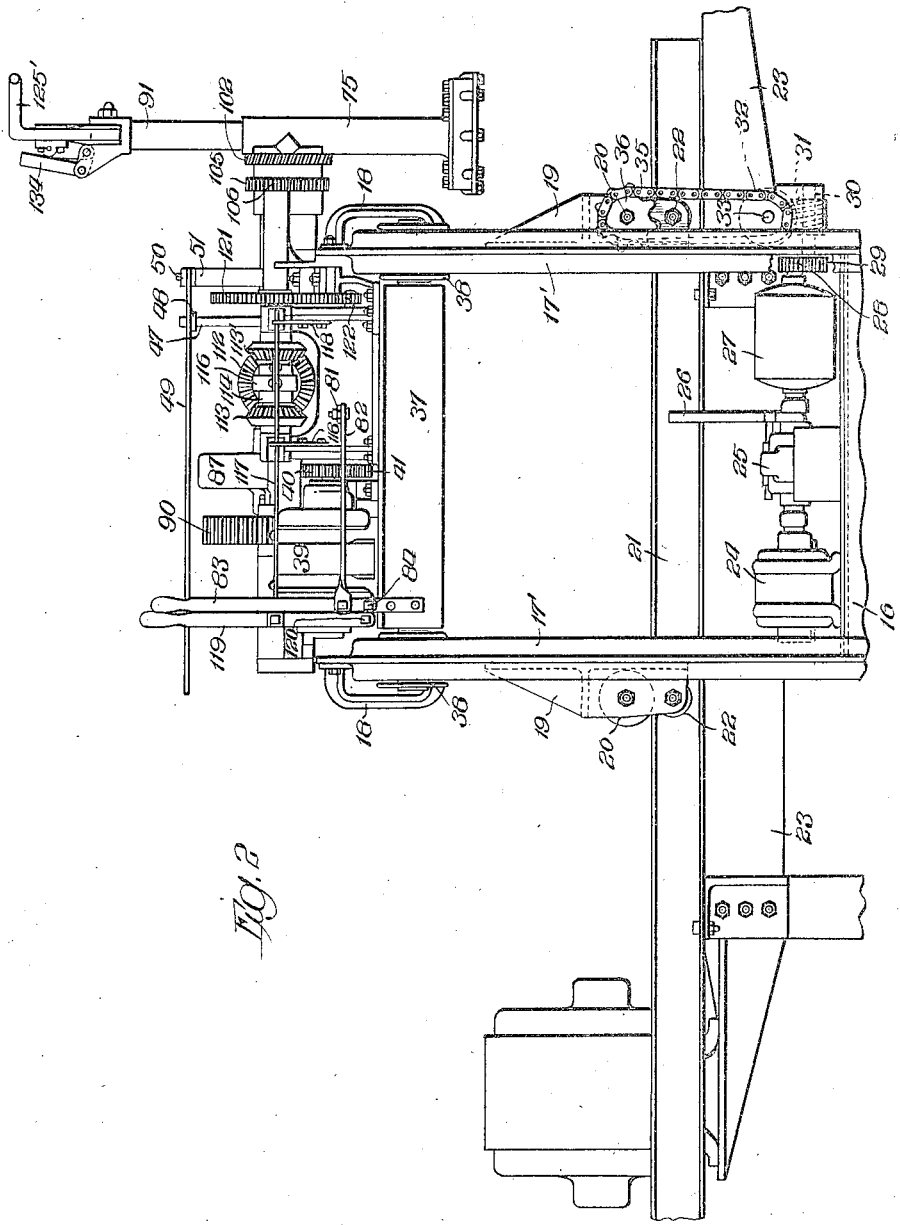
Fig. 2 is a side elevation of the construction seen in Fig. 1.

The preferred form of construction, as illustrated in the drawings, comprises a carriage 16 composed of spaced longitudinally extending side pieces from the ends of which arise spaced arched rails, each of which consists of two spaced arched ribs or rail members 17 and 17', as clearly seen in Figs. 2 and 3. For re-enforcement, the upper portions of the rail members 17 and 17' at each end of the carriage are connected by a brace or strap 18. Said rail members 17 and 17' are preferably of T shape in cross section with the webs of said rails on the remote sides thereof. To the inwardly projecting webs of rail members 17 are secured brackets 19, as clearly seen in Fig. 3, in which are mounted channel wheels 20 adapted to engage supporting rails 21 along which the carriage is adapted to travel longitudinally of the bore of the tunnel. Upon the brackets 19 are also mounted supplemental wheels 22 which are adapted to engage under the flange portions of said rails in order to stabilize the carriage and prevent tipping of the same through unbalancing which results during the lifting of the structure blocks by the erector as hereinafter described.

In the form of construction seen in Figs. 1, 2 and 3, the rails 21 are mounted directly upon the upper portion of a conventional tunnel boring or excavating machine 23, the arrangement being such that, in use, the excavator and erector will be superimposed permitting of simultaneous operation thereof. The bowed or arched formation of the rail members 17 and 17' is such that said rails avoid contact with the excavator or tunnel boring machine, permitting of uninterrupted operation of the same, notwithstanding the fact that the central or main shaft thereof is disposed centrally or axially of the tunnel bore.

The propulsion of the carriage 16 along rails 21 is effected through the medium of an electric motor 24 mounted upon said carriage at one side thereof, as clearly seen in Fig. 2. Said motor drives through a standard commercial friction reversing clutch 25 having an operating lever 26 and also through a speed reducer 27 of approved design. At the low speed side of said speed reducer is provided a gear 28 meshing with a gear 29 on a shaft 30. Also provided upon said shaft 30 is a worm 31, as clearly seen in Figs. 2 and 3, which meshes with a worm wheel 32 carried by a shaft 33. Upon shaft 33 is provided a sprocket wheel 34 which is connected through the medium of an endless sprocket chain 35 with a sprocket wheel 36 connected with one of the carriage wheels 20. With this arrangement it will be seen that an operative connection is established between the motor 24 and one of the wheels of the carriage whereby forward and backward movement of said carriage, longitudinally of the tunnel bore, may be effected.

If desired, the carriage, instead of being mounted upon the tunneling or boring machine, may be mounted to travel upon rails 21'', as seen in Fig. 4, which may be suitably supported within the tunnel bore in any suitable manner. In this case, however, brackets 19' will be provided depending from the sides of the carriage and in which wheels 20' and 22' will be mounted for engagement with rails 21'. Where this mounting of the carriage is used, the shaft 33 will be extended laterally and provided with a sprocket wheel 34' which will be connected by a sprocket chain 35' with a sprocket wheel 36' on one of the wheels 20', in practically the same manner as in the case of the wheel 20 through which the driving of the carriage is accomplished in the form first described.

Where the erector is used in connection with a tunnel shield A as shown in Figs. 16 and 17, the rails 21' would be mounted on brackets 19'' secured within said shield. The shield A is shown provided with conventional thrusting devices B whereby the same is moved forward in the tunneling operation.

Adjustably supported upon the rails of the carriage 16 is a carrier or platform 37 having channel wheels 38 which are arranged to travel between the carriage rail members 17 and 17', the arrangement being such that the carriage is thus adapted to travel in a substantially arcuate path from one side of the carriage to the other, the travel of said carrier at the sides of the carriage being vertical, and at the upper portion of the carriage being in a curved or semi-circular path.

Upon the carrier 37 is mounted a second electric motor 39 upon the power shaft of which is provided a gear 40 meshing with a gear 41 provided upon a shaft 42 mounted in suitable bearings provided upon said carrier, as clearly seen in Figs. 1 and 10. Also fixed to the shaft 42 is a bevel gear 43 which meshes with a bevel gear 44 upon a shaft 45 extending transversely of the carrier and mounted in suitable bearings provided thereon. The shaft 45 is connected with a standard commercial friction reversing clutch 46, the frictions of which are controlled by a pivotally mounted lever 47 connected at its upper end by means of a link 48 with a manually operable lever 49, fulcrumed at 50 on the upper end of a support or post 51 suitably anchored at its lower end. The clutch 46 drives a spur gear 52, as clearly seen in Fig. 1, which meshes with a gear 53 upon a shaft 54 suitably mounted in bearings provided upon carrier 37. Upon the shaft 54 is also provided a bevel gear 55 meshing with a bevel gear 56 upon a shaft 57 extending longitudinally of the carrier and mounted in suitable bearings provided thereon. Connected with the shaft 57 is a conventional worm speed-reducer 58, upon the low speed shaft of which is provided a gear 59 which meshes with a gear 60 fixed to a shaft 61 extending transversely of the carrier and mounted in suitable bearings which arise therefrom, as clearly seen in Fig. 8. Upon the shaft 61 is provided a worm 62 which meshes with a worm wheel 63 upon a shaft 64 arranged longitudinally of the carrier and mounted in bearings provided at the under side thereof, as clearly seen in Fig. 6. Upon the shaft 64 is also fixed a pinion 65 meshing with a gear 66 provided upon a transversely extending shaft 67 suitably mounted at the under side of the carrier. The shaft 67 also carries a pinion 68 which meshes with a pinion 69 upon a shaft 70 extending transversely of the carrier and provided at its ends with pinions 71 which mesh with racks 72 formed at the inner sides of rail members 17 as seen in Figs. 6 and 10.

The arrangement is such, as will be seen, that an operative connection is established between the motor 39 and the pinion 71, rotation of said pinions effecting the desired travel of the carrier between rail members 17 and 17', it being clear that rotation of said pinions in one direction effects movement of the carriage in one direction, reverse rotation of said pinions effecting travel of the carrier in the opposite direction.

Rotatably mounted in bearings 73 arising from carrier 37 is a centrally positioned longitudinally extending main shaft 74, at the forward end of which is carried an erector arm 75, said arm having a hub 75' which embraces and is rigidly fastened to said shaft, as clearly seen in Figs. 6 and 11. Rotation of the erector arm 75 is secured through bevel gears 76 and 76', which are loosely mounted upon the shaft 42, as best seen in Figs. 1, 6 and 9. The gears 76 and 76' mesh with a bevel gear 77 which is fixed to a transversely extending shaft 78, as seen in Figs. 1 and 6. Splined to the shaft 42, between the gears 76 and 76', is a conventional clutch 79 to the loose sleeves of which the bevel gears 76 and 76' are secured. Said clutch is controlled through the medium of a shifting fork 80 having a laterally projecting stem 81, which is pivotally mounted in a bearing member 82 arising from carrier 37, as best seen in Figs. 2, 9 and 10.

The outer end of the stem 81 is connected by means of a link 82 with a manually operable lever 83 fulcrumed to carrier 37 at 84, as clearly illustrated in Fig. 2. The arrangement is such, as will be clear, that the clutch 79 may be shifted to operatively connect one or the other to gears 76 and 76' with the shaft 42, it being clear that with one of said gears operatively connected with said shaft, the shaft 78 will be driven in one direction, and, with the other of said gears operatively connected, said shaft 78 will be driven in the opposite direction.

Fixed to the shaft 78, as seen in Figs. 1 and 6, is a gear 85 meshing with a gear 86 which is operatively connected with the high speed side of a standard worm reducer 87. At the low speed side of said reducer is provided a pinion 89 which meshes with a gear 90 fixed to the shaft 74.

Thus an operative connection is established between the motor 39 and the main erector shaft 74 whereby said shaft may be rotated in either direction, the direction of rotation being, of course, controlled through manipulation of lever 83, as above described.

Slidably mounted in erector arm 75 and in splined connection therewith, is a tubular extension or section 91 at the outer end of which is provided the work holding element which will be hereinafter more fully described. Slidable adjustment of the member 91 is effected by means of a screw 92 having threaded connection with the member 91, as best seen in Fig. 11. To hold the said screw 92 against relative longitudinal movement, the same is provided adjacent one end with an annular flange 93 adapted for engagement, at one side, with an internal shoulder 94 provided in arm 75, the opposite side of said flange 93 being engaged by the hub of a housing 95 which is mounted upon and securely fastened to a plate or end piece 96 provided at the outer extremity of said arm 75.

One side of housing 95 is closed by a removable plate 97, and within said housing is provided a gear 98 fixed to screw 92. Meshing with said gear 98, as seen in Fig. 12, is a pinion 99 fixed to one end of a shaft 100 arranged parallel to the arm 75 and mounted in suitable bearings provided thereon. The opposite end of shaft 100 is provided with a spiral pinion 101 which meshes with a spiral gear 102 which is loosely mounted upon the hub 75' of arm 75. The gear 102 is held against longitudinal shifting upon hub 75' by means of a collar 104, which is arranged to abut one end of the hub 103 of said gear 102. Fixed to said hub 103 of gear 102 is a spur gear 105, which, as best seen in Fig. 1, meshes with a pinion 106 fixed to a shaft 107 mounted in a suitable bearing 108 arising from carrier 37. To shaft 107 is also fixed a bevel gear 109 which meshes with a bevel gear 110 fixed to a transversely extending shaft 111 mounted in suitable bearings provided on said carrier. Also fixed to shaft 111 is a bevel gear 112 meshing with bevel gears 113 and 113' carried by the loose sleeves of a standard clutch 114 provided upon a shaft 115 mounted in bearing 82.

Said clutch 114 is actuated to effect operative connection of one or the other of gears 113 and 114 with shaft 115, by means of a shifting fork 116 carried by a bar 117 slidably mounted in slotted guide plates 118 suitably anchored upon the carrier. Said bar 117 is shifted to and fro by means of a manually operable lever 119, fulcrumed at 120 upon the carrier, as clearly illustrated in Fig. 2. Upon the shaft 115 is also fixed a spur gear 121 which meshes with a pinion 122 provided upon shaft 42; the latter, as heretofore described, being connected through the medium of gears 40 and 41 with motor 39.

With the arrangement just described, it will be seen an operative connection is established between the motor 39 and the screw 92 whereby said screw may be rotated in either direction to effect longitudinal adjustment of the erector arm,—that is, sliding of the erector arm member 91 to adjust the work holder carried thereby radially with respect to the shaft 74. The direction of rotation of screw 92, and hence the movement of arm member 91 outwardly and inwardly, is, of course, controlled through manipulation of lever 119 which controls the actuation of clutch 114.

The work holder carried at the outer end of the erector arm member 91, as clearly seen in Figs. 13, 14 and 15, comprises a channel formed head 123 having a stem 124, which is fixed in the outer end of said member 91. Pivotally mounted in the head 123 are two angularly formed work engaging arms 125, the pivotal connection of said arms with the head 123 being effected by means of a bolt 126. Outward rocking of said arms 125 and 125' is limited through engagement of shoulders 127 provided at the inner ends thereof with the inclined surfaces 128 on the head 123, as best seen in Fig. 13. Said work engaging arms are of such form as to adapt the same to engage the particular form of structure block or element 129 in connection with which the erector is used, the precise form of said arms and, in fact, the precise form of the holder being determined by the character of the blocks or structure elements to be engaged thereby.

With the form of holder shown, however, the arms 125 and 125' are designed to rock outwardly and thus temporarily engage the work, said arms being adapted to be moved to and held in clamping position by means of a wedge member 130, which is slidably mounted between said arms, as clearly seen in the several views above referred to. Sliding adjustment of said wedge member is effected by means of a link 132, one end of which is connected at 131 with said wedge member, the opposite member of said link being connected at 133 with a bell crank lever 134 fulcrumed at 135 between supporting lugs 136, projecting from one side of the head 123. With the arrangement set forth it will be seen that movement of the wedge member is controlled by pivotal movement of said bell crank lever, locking or unlocking of the arms 125 and 125', being thus controlled by manipulation of said bell crank lever.

With a tunnel erector of the construction set forth, it will be seen that a machine is provided, which is capable of universal movement to carry the tunnel structure elements or work from practically any position in the tunnel bore to any other position in the erecting operation. In this operation it will be seen that the erector is capable of movement longitudinally of the tunnel bore through the wheeled mounting of the carriage 16, this movement, backward or forward, being controlled through manipulation of lever 26. At the same time the carrier 37 is capable of movement transversely of the tunnel bore in a substantially arcuate path adjacent the periphery or wall of the tunnel bore, and spaced from the axial or central portion thereof. This movement of the carrier is secured through the mounting thereof in the carriage rails constituted by the rail members or ribs 17 and 17', and the movement of said carrier, in either direction between said rail members, is controlled through manipulation of the lever 49. This movement of the erector circumferentially of the tunnel bore is rendered more complete through the rotary adjustment of the main erector shaft 74 which is mounted upon said carrier, rotary adjustment of said shaft being controlled by manipulation of lever 83. Adjustment of the work holder radially with respect to said shaft 74, and hence radially with respect to the tunnel bore, is secured through the adjustable mounting of the erector arm member 91, and such movement of said arm member is controlled through manipulations of the lever 119. Thus it will be seen that an arrangement is provided in which universal movement of the work holder or carrier is permitted, and in which the various movements of the work holder are effected mechanically, although under manual control.

Moreover, an arrangement is provided in which the erector occupies only a space adjacent the walls of the tunnel bore, leaving the central or axial portion of the bore to be occupied by a tunneling machine which may be operated simultaneously therewith, or muck or material cars which may readily pass thereunder. In this latter connection it is desired, also, to call attention to the fact that through the elevation or arched formation of the central portion of the erector carriage, muck cars of the full height may be employed, as distinguished from the very low muck cars and hence cars of limited capacity, which may be employed in connection with erectors which occupy the center or central portion of the tunnel bore.

Also, with the construction set forth it will be seen that the lining blocks or work may be picked up at either side of the bottom of the tunnel bore, leaving the center for the passage of the muck cars. In erectors in use at the present time in which a centrally positioned main erector shaft is employed, it becomes necessary to divert the muck to a side conveyor where passing the erector, inasmuch as in the type of erector referred to, the same is capable of picking up the lining or construction blocks only directly below the center of the bore where the conveyor should be located and where, with the present construction, the conveyor may be located.

While I have illustrated and described the preferred form of construction of carrying my invention into effect this is capable of variation and modification without departing from the spirit of the invention. For instance, electric motors are shown for effecting the various movements of the erector elements, but it is understood that any other type of power producer or generator may be employed if desired. Also, if the erector is shown so positioned that the erector arm is located at the front end thereof or adjacent the face of the bore, but, it is understood, that the position of the erector may be reversed so as to be capable of operation in this position as well. I, therefore, do not wish to be limited to the precise details of construction set forth, but desire to avail myself of such variations and modications as come within the scope of the appended claims.

Having thus described my invention, what I claim is new and desire to secure by Letters Patent is:

1. A tunnel structure erector comprising a movably mounted work holder; and means for moving said holder radially, circumferentially, and longitudinally of the tunnel bore.

2. A tunnel structure erector comprising a movably mounted work holder; and means for simultaneously or succesively moving said holder radially, circumferentially, and longitudinally of the tunnel bore.

3. A tunnel structure erector comprising a movable carrier; means for moving said carrier in a circular path about the axis of the tunnel bore; a work holder movably mounted on said carrier; and means for moving said holder in a circular path and radially with reference to said carrier.

4. A tunnel structure erector comprising a movably mounted carrier; means for moving said carrier in a circular path; and work holding means on said carrier.

5. A tunnel structure erector comprising a movable carrier; means for moving said carrier in a curved path disposed in a plane extending substantially transversely of the bore of the tunnel; and work holding means on said carrier.

6. A tunnel structure erector comprising a movably mounted carriage; means for moving said carriage longitudinally of the bore of the tunnel; curved rails extending transversely of the tunnel bore mounted on said carriage; a carrier having means engaging said rails for travel thereon; and work holding means on said carrier.

7. A tunnel structure erector comprising a movably mounted carriage; means for moving said carriage longitudinally of the bore of the tunnel; arched rails extending transversely of the tunnel bore provided on said carriage; a carrier having means engaging said rails for travel thereon; and work holding means on said carrier.

8. A tunnel structure erector comprising a movably mounted carriage; means for moving said carriage longitudinally of the bore of the tunnel; rails on said carriage extending around and spaced from the axis of the tunnel bore; a carrier having means engaging said rails for travel thereon; and work holding means on said carrier.

9. A tunnel structure erector comprising a movably mounted carriage; means for moving said carriage longitudinally of the bore of the tunnel; spaced rails on said carriage extending around and spaced from the axis of the tunnel bore; a carrier having wheels mounted to travel on said rails; and work holding means on said carrier.

10. A tunnel structure erector comprising a movable carrier; means extending around and spaced from the axis of the tunnel bore for causing said carrier to move in a path extending around and spaced from the axis of the tunnel bore; and work holding means on said carrier.

11. A tunnel structure erector comprising a movable carrier; means extending around and spaced from the axis of the tunnel bore for causing said carrier to move in a circular path extending around and spaced from the axis of the tunnel bore; and work holding means on said carrier.

12. A tunnel structure erector comprising a movable carrier; means extending around and spaced from the axis of the tunnel bore for causing said carrier to move in a circular path extending around and spaced from the axis of the tunnel bore; and work holding means rotatably mounted on said carrier.

13. A tunnel structure erector comprising a movable carrier; means extending around and spaced from the axis of the tunnel bore for causing said carrier to move in a circular path around and spaced from the axis of the tunnel bore; work holding means rotatably mounted on said carrier; and means for adjusting said work holding means radially with respect to its axis of rotation.

14. The combination with a tunneling machine occupying the axial portion of the tunnel bore, of a tunnel structure erector comprising movable work holding means; and means for causing said work holding means to move in a circular path extending around said tunneling machine in a transverse plane which intersects said machine.

15. The combination with a tunneling machine occupying the axial portion of the tunnel bore, of a tunnel structure erector comprising movable work holding means; and means for causing said work holding means to move in a circular path extending around and spaced from the top and sides of said tunneling machine.

16. The combination with a tunneling machine occupying the axial portion of the tunnel bore and having a space between the same and the walls of the tunnel bore, of a tunnel structure erector arranged for operation upon said tunneling machine, said tunnel structure erector comprising a carriage; means for moving said carriage in said space longitudinally of the tunnel bore; a carrier movable on said carriage in said space transversely of the tunnel bore; and work holding means on said carrier.

17. The combination with a tunneling machine occupying the axial portion of the tunnel bore and having a space between the same and the walls of the tunnel bore, of a tunnel structure erector comprising a carriage occupying said space; means for moving said carriage in said space longitudinally of the tunnel bore; a carrier movable on said carriage in said space transversely of the tunnel bore; and rotatably and radially adjustable work holding means on said carrier.

18. A tunnel structure erector comprising a carriage; rails on said carriage extending around, and spaced from, the axis of the tunnel bore; a wheeled carrier mounted to travel on said rails; racks on said rails; pinions on said carrier engaging said racks to control the movement thereof on said rails; and working holding means on said carrier.

19. A tunnel structure erector comprising a carriage; rails on said carriage extending around, and spaced from, the axis of the tunnel bore; a wheeled carrier mounted to travel on said rails; racks on said rails; pinions on said carrier engaging said racks to control the movement thereof on said rails; means for driving said pinions; and work holding means in said carriage.

20. In a tunnel structure erector, supporting means, a longitudinally adjustable sectional arm supported by said means for rotary movement about an axis disposed at right angles to said arm; a screw connecting the sections of said arm; and means for rotating said screw to effect relative longitudinal movement of said arm sections during rotary movement of said arm.

21. In a tunnel structure erector, supporting means, a longitudinally adjustable sectional arm supported by said means for rotary movement about an axis disposed at right angles to said arm; a screw connecting the sections of said arm; means for rotating said screw to effect relative longitudinal movement of said arm sections during rotary movement of said arm; said means comprising a shaft arranged parallel with said screw and in gear connection therewith; a spiral pinion on said shaft; a loosely mounted spiral gear meshing with said pinion and arranged with its axis coincident with the axis of rotation of said arm; and means for driving said spiral gear.

22. In a tunnel structure erector, an erector arm; a work holder on said arm comprising a plurality of movably mounted clamping elements movable toward and from each other; and means movable longitudinally of said clamping elements for moving said clamping elements toward and locking the same in clamping position.

23. In a tunnel structure erector, an erector arm; a work holder on said arm comprising a plurality of movably mounted clamping elements movable toward and from each other, and a shiftably mounted wedge member for moving said clamping elements toward and locking the same in clamping position.

In witness whereof, I have hereunto subscribed my name.

LOUIS W. ANDERSON.